Jan. 1, 1963 C. GIAMPAPA ETAL 3,070,959
FLUID PRESSURE OPERATED MECHANISMS
Filed April 6, 1959 7 Sheets-Sheet 3
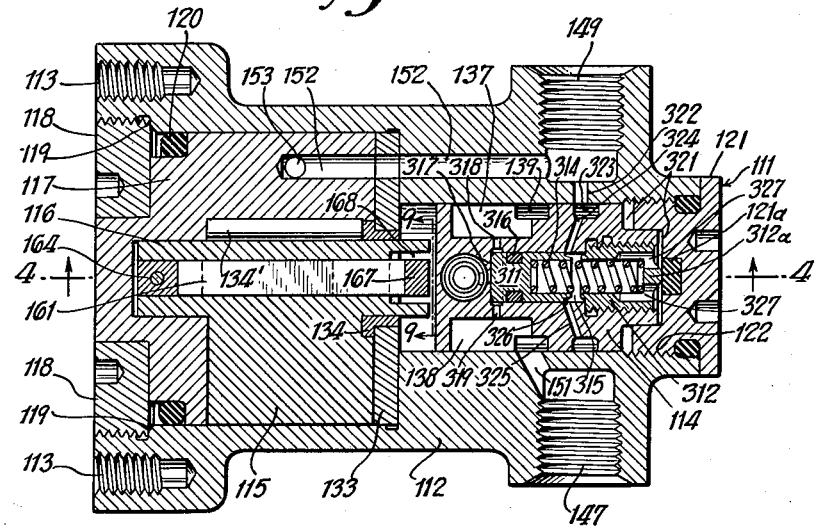
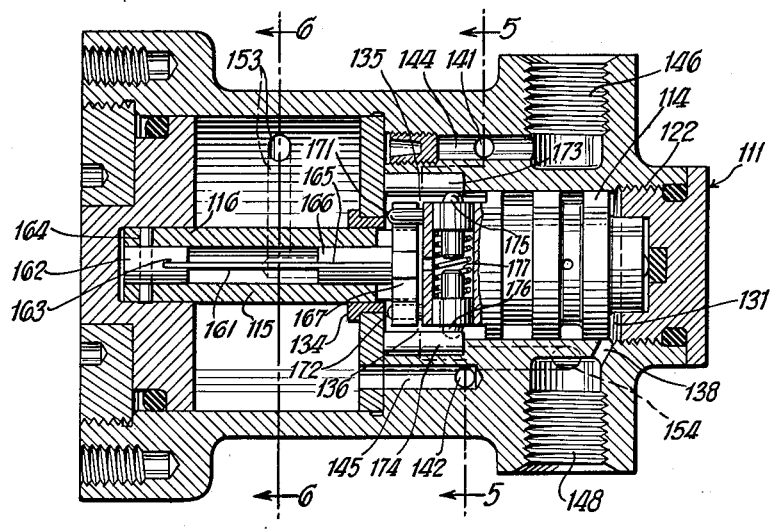
INVENTORS.
CIRINO GIAMPAPA.
MAURICE PALESCHUCK.
BY JOHN O. BRUNO.
Ward, Neal, Haselton, Orme & McChannon
ATTORNEY.

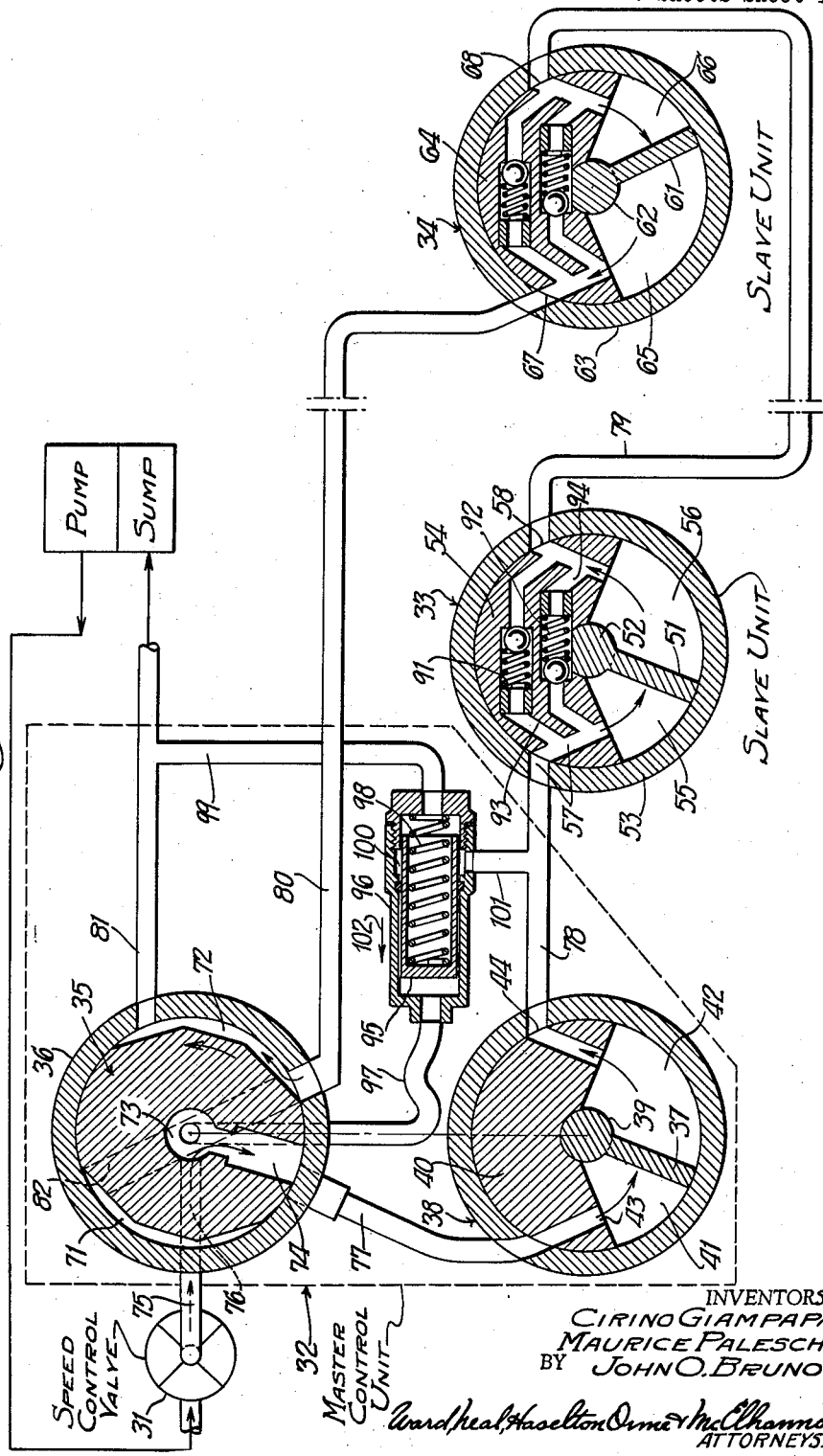

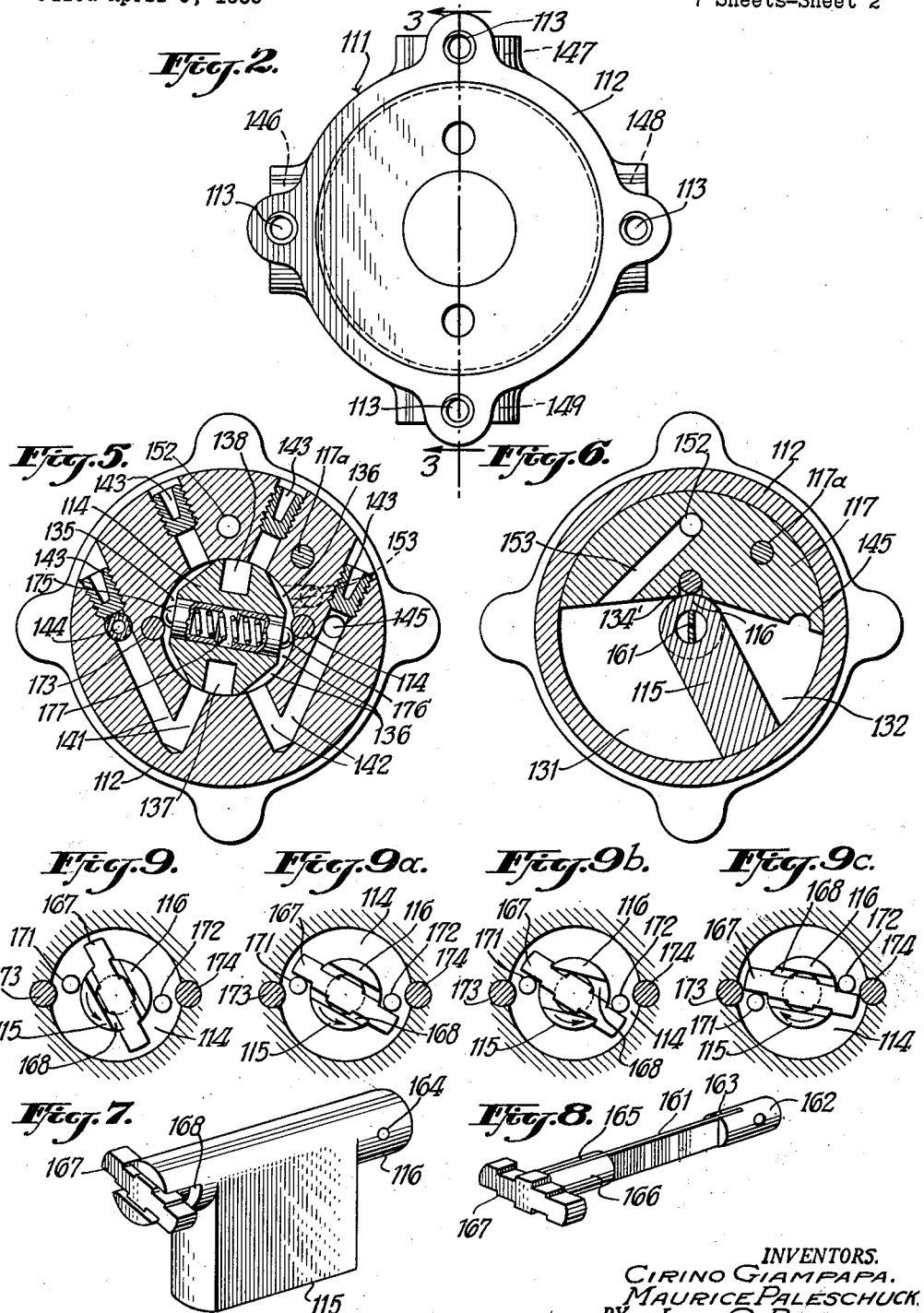

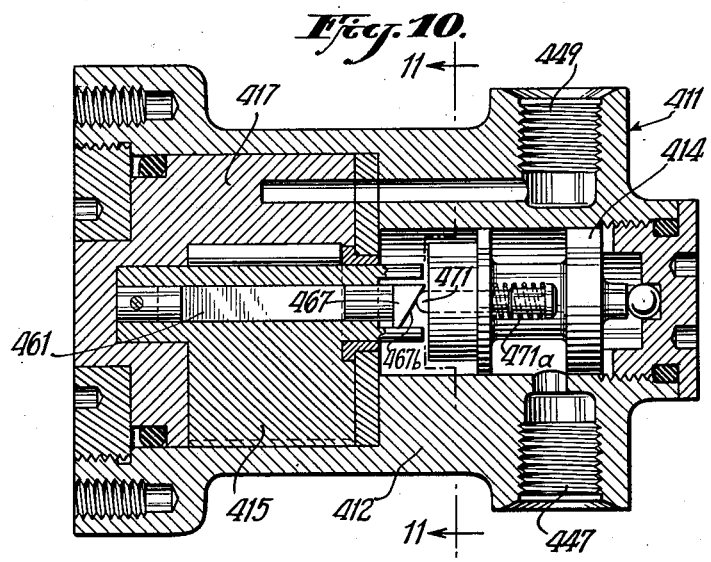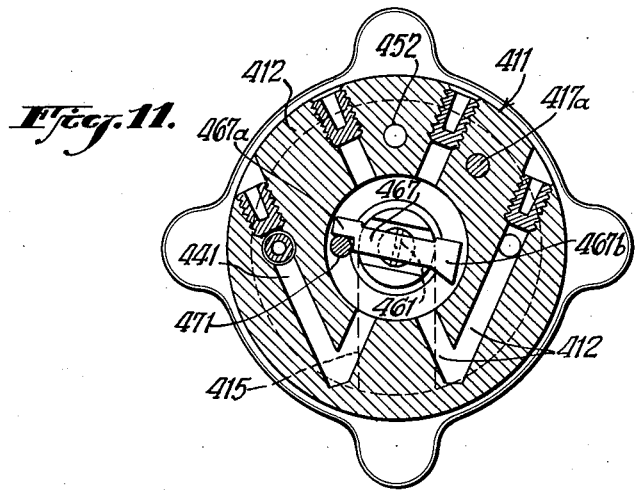

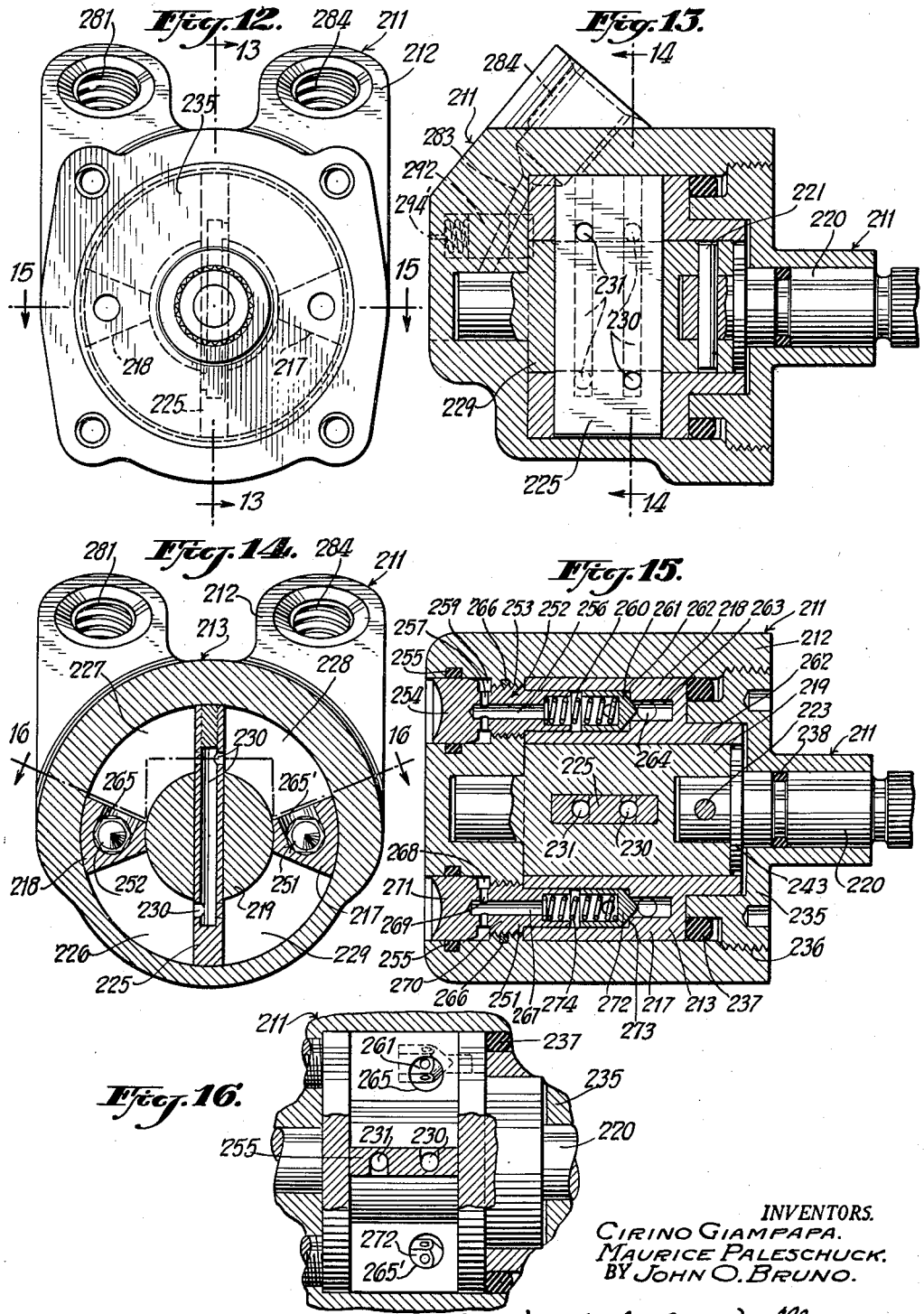

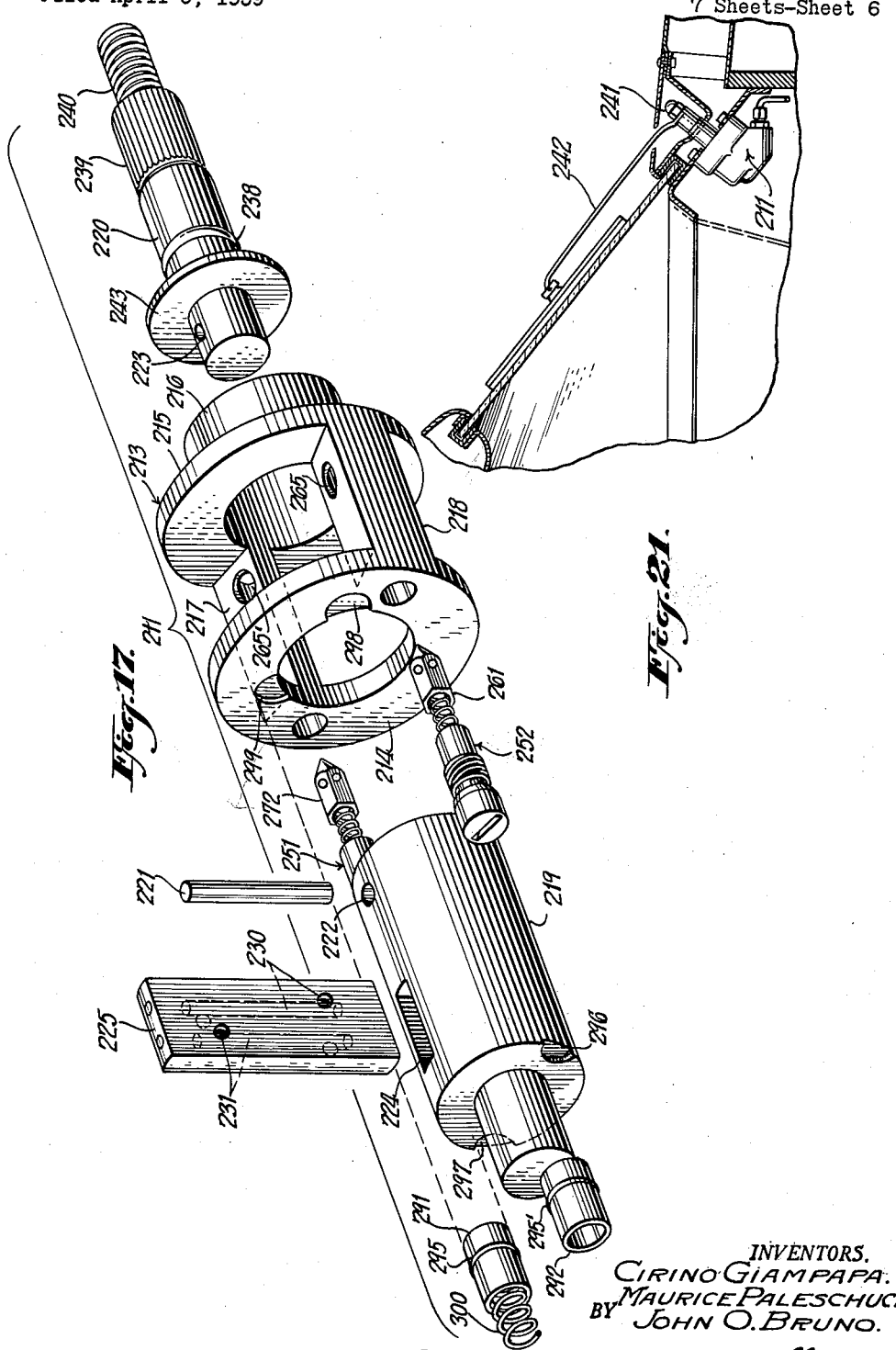

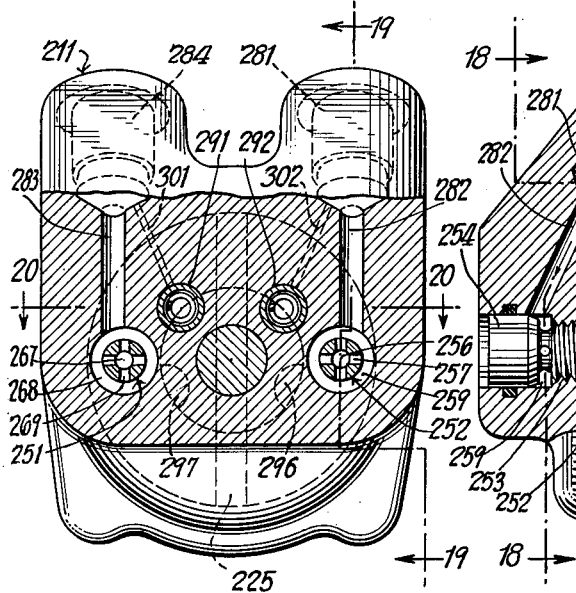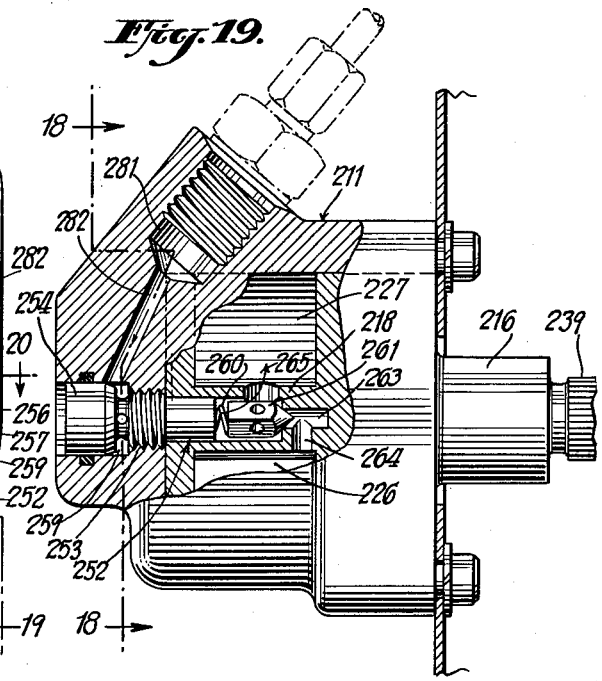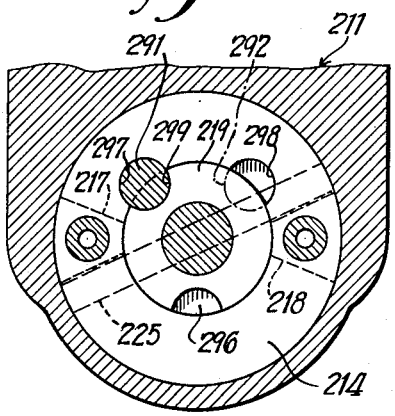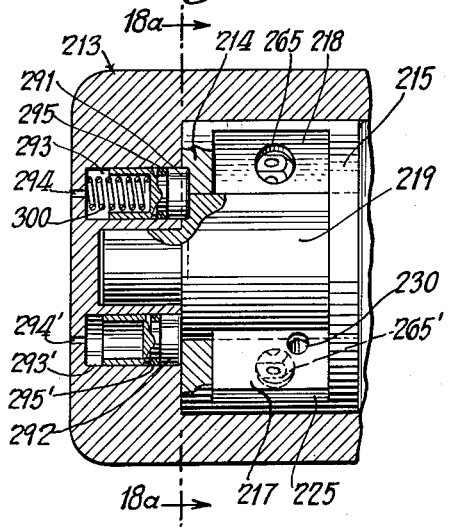

United States Patent Office 3,070,959
Patented Jan. 1, 1963

3,070,959
FLUID PRESSURE OPERATED MECHANISMS
Cirino Giampapa and Maurice Paleschuck, Massapequa, and John O. Bruno, Yonkers, N.Y., assignors to Hydra-Power Corporation, New Rochelle, N.Y., a corporation of New York
Filed Apr. 6, 1959, Ser. No. 804,415
11 Claims. (Cl. 60—54.5)

This invention relates to fluid pressure operated mechanisms and more particularly to fluid pressure operated motors and control means for controlling the operation of the same.

Many fluid pressure operated motors such as those for operating windshield wipers on aircraft must be capable of producing large amounts of output torque in relation to the size and weight of the unit and should be capable of doing this at relatively high efficiencies in order to reduce the requirements for operating power. It is an object of this invention to provide an improved fluid pressure operated control means and associated motor of light weight rugged construction and adapted for instance for use in operating aircraft windshield wipers.

One embodiment of the invention comprises fluid pressure operated mechanism including at least two pressure fluid power chambers, each of which has a power vane disposed therein for angular oscillating movement and each of which has fluid ports positioned on opposite sides of its power vane respectively. Valve means operable by the angular movement of the power vane of one of said chambers is provided for controlling the alternate flow of fluid on the opposite sides of the vane. The mechanism also includes means for passing fluid between the valve means and the fluid port on one side of the vane of said one chamber, means for passing fluid between the fluid port on the other side of the vane of said one chamber and the fluid port on one side of the vane of said other chamber and means for passing fluid between the fluid port on the other side of the vane of said other chamber and said valve means.

For a better understanding of the invention, reference should be had to the accompanying drawings which form a part of this specification and illustrate by way of example one embodiment of the invention. The invention consists in such novel features and combinations of parts as may be shown and described in connection with the apparatus herein disclosed.

In the drawings:

FIG. 1 is a somewhat schematic illustration of certain of the components of a fluid pressure mechanism constructed in accordance with one embodiment of the invention;

FIG. 2 is an end elevational view of the control unit of the mechanism diagrammatically illustrated in FIG. 1;

FIG. 3 is a sectional view taken along line 3—3 of FIG. 2;

FIG. 4 is a sectional view taken on line 4—4 of FIG. 3;

FIG. 5 is a sectional view taken on line 5—5 of FIG. 4;

FIG. 6 is a sectional view taken on line 6—6 of FIG. 4;

FIG. 7 is a perspective view showing in greater detail certain of the components of the apparatus shown in FIGS. 3 and 4;

FIG. 8 is a perspective view showing certain of such components in still greater detail;

FIGS. 9 and 9a through 9c are fragmentary sectional views taken as indicated by lines 9—9 of FIG. 3 and illustrating the different positions of operation of certain components of the apparatus shown in FIGS. 3 and 4;

FIG. 10 is a sectional view similar to FIG. 3 and showing a modified form of the apparatus shown in FIG. 3;

FIG. 11 is a cross-sectional view taken at line 11—11 of FIG. 10;

FIG. 12 is a plan view showing a fluid pressure motor constructed in accordance with one embodiment of the invention;

FIG. 13 is a sectional view taken along line 13—13 of FIG. 12;

FIG. 14 is a sectional view taken along line 14—14 of FIG. 13;

FIG. 15 is a sectional view taken along line 15—15 of FIG. 12 and rotated clockwise through an angle of 90°;

FIG. 16 is a fragmentary sectional view taken as indicated by line 16—16 of FIG. 14 and shown rotated counterclockwise through an angle of 90°;

FIG. 17 is a perspective view showing portions of the apparatus shown in FIG. 12 in exploded relation;

FIG. 18 is another view of the apparatus shown in FIG. 12 with portions broken away in section as indicated by line 18—18 of FIG. 19;

FIG. 18a is a plan view of certain parts as shown in FIG. 18 but showing the parts in a different position of operation;

FIG. 19 is another view of the apparatus shown in FIG. 12 partially in section as indicated by line 19—19 of FIG. 18;

FIG. 20 is a fragmentary sectional view of the apparatus with some parts removed, taken as indicated by line 20—20 of FIG. 18 but with the parts in the position shown in FIG. 18a; and FIG. 21 is a side elevational view showing the apparatus shown in FIG. 12 positioned for operating an aircraft windshield wiper.

Before describing the preferred structural details of the several parts of the apparatus it will be helpful to first understand the operation of a simplified form of the system as a whole. Throughout the drawings the apparatus is shown on a substantially enlarged scale (approximately twice actual size) to better illustrate the features.

Referring to the drawings, FIG. 1 is a schematic illustration of fluid pressure mechanism constructed in accordance with the invention and including a speed control valve 31, a master control unit 32, and remotely controlled slave units 33 and 34. The speed control valve 31 may be of any suitable form such as a conventional needle valve and is adapted to regulate the flow of fluid under pressure entering the control unit 32. As shown schematically in FIG. 1, the control unit 32 includes a valve 35 mounted for oscillation in a valve housing 36 and a control vane 37 mounted for oscillation within a housing 38 on a shaft 39. The housings 36 and 38 may be separate or as in the preferred embodiment more specifically described below in connection with the remaining figures, may form a single housing. A block 40 in the housing 38 defines the limits of fluid pressure chambers 41 and 42 on either side of the vane 37 respectively. Passageways 43 and 44 extend through the housing 38 and block 40 to provide access to the fluid chambers 41 and 42 respectively.

The slave unit 33 includes a vane 51 mounted on a shaft 52 for oscillation within a housing 53. A block 54 mounted within the housing 53 defines the space within which the vane oscillates and which space is divided by the vane into fluid pressure chambers 55 and 56. Fluid passageways 57 and 58 passing through the housing 53 and spacer block 54 provide access to the fluid chambers 55 and 56 respectively. Likewise, the slave unit 34 includes a vane 61 mounted on a shaft 62 for oscillation within a housing 63. A spacer block 64 is mounted within the housing 63 and defines the space within which the vane oscillates. The space is divided by the vane 61 into fluid pressure chambers 65 and 66. Fluid passageways 67 and 68 provide access to the chambers 65 and 66 respectively.

As shown in FIG. 1, the valve 35 of the master control unit is provided with peripheral fluid passages 71 and 72, a central passageway 73 and a radial passageway 74. Fluid under pressure is supplied to the central passageway 73 from the speed control valve 31 by a conduit 75 which passes through the housing 36 and is in constant fluid communication with a passageway 76 extending radially from the central passageway 73. In the position shown in FIG. 1, the valve 35 is positioned so as to allow the fluid under pressure to pass from the central passageway 73 through the passageway 74 and a conduit 77, through the passageway 43 from which it is discharged into the pressure chamber 41 of the control unit. The pressure thus exerted on the vane 37 by the pressure fluid forces the vane in a counterclockwise direction thereby forcing fluid out of the chamber 42 through the passageway 44. From the passageway 44 the thus displaced fluid passes through a conduit 78 and the passageway 57 to the chamber 55 of the slave unit 33. In the slave unit 33 the increased fluid pressure in the chamber 55 forces the vane 51 in a counterclockwise direction thereby displacing fluid from the chamber 56 through the passageway 58. The thus displaced fluid passes from the passageway 58 through a conduit 79 and the passageway 68 to the chamber 66 of the slave unit 34, which in turn forces the vane 61 in a clockwise direction, thereby displacing fluid from the chamber 65. Displaced fluid from the chamber 65 passes through the passageway 67 and through a conduit 80 to the fluid passage or chamber 72 of the control unit. From the fluid passage or chamber 72 the fluid is free to pass through a conduit 81 to a fluid sump which may conveniently serve as a source of fluid from which fluid may be pumped under pressure to supply fluid for the system as described above.

The valve 35 is operatively connected with the shaft 39, in a manner to be more completely described below in connection with the remaining drawings, whereby the vane 37 and shaft 39 turn in a counterclockwise direction as described above. As the control vane 37 nears the end of its counterclockwise stroke it actuates the valve 35 to cause the same to rotate in a counterclockwise direction to a position in which the passageway 74 is in communication with the conduit 80 rather than the conduit 77. This may be accomplished in any suitable manner, such as the manner described below in connection with the remaining drawings. It can be seen from FIG. 1 that when the passageway 74 is in communication with the conduit 80, the conduit 77 will be in communication with the peripheral passageway 71, while the conduit 80 will no longer be in communication with the fluid chamber 72. With the valve 35 in this position the fluid under pressure passes outwardly through passageway 74 through the conduit 80 and passageway 67 to the fluid chamber 65 of the slave unit 34 thereby forcing the vane 61 in a counterclockwise direction. Such counterclockwise movement of the vane 61 displaces fluid from the fluid chamber 66 through the passageway 68, conduit 79 and passageway 58 into the chamber 56 of the slave unit 33, where it forces the vane 51 in a clockwise direction, which in turn displaces fluid from the chamber 55 through the passageway 57, conduit 78 and passageway 44 into the chamber 42 of the control unit 32, where it acts to move the vane 37 in a clockwise direction. Such clockwise movement of the vane 37 displaces fluid from the chamber 41 through passageway 43, and conduit 77 into the passageway 71 then in register therewith. A passageway 82 extends through the valve 35 in communication with the fluid passageways 71 and 72 so that fluid entering the passageway 71 as described above may pass through the passageway 82 to the passageway 72 and thence out the conduit 81 to the sump. When the vane 37 nears the extreme limit of its clockwise movement, it causes the valve 35 to return to the position shown in FIG. 1 in which the passageway 74 is in communication with the conduit 77 and the entire cycle is repeated.

From the above description it can be seen that the control unit 32 causes the vanes 51 and 61 of the slave units to oscillate with the same amplitude and frequency as the vane 37 of the control unit. In the embodiment shown, the vanes 51 and 61 are arranged to oscillate in opposite directions, i.e., one clockwise while the other counterclockwise, but it should be obvious that by rearranging the connections of the conduits to the slave units, the vanes could be made to oscillate in the same direction. For example, by connecting the conduit 80 to the passageway 68 rather than the passageway 67 and connecting the conduit 79 to the passageway 67 rather than the passageway 68, the vanes 51 and 61 would be caused to oscillate in the same direction. It should also be obvious that any number of slave units may be provided in accordance with the principles discussed above. In a preferred embodiment of the invention, the shafts 52 and 62 of the slave units may be operatively connected to windshield wipers and it is contemplated that one such slave unit may be placed in each position in which it is desired to operate a windshield wiper while the control unit may be placed at a remote location. This feature of the invention is especially valuable in the operation of aircraft windshield wipers since space immediately under the windshield sections of aircraft cockpits is usually insufficient for all of the equipment it may be found desirable to place there and the location of the control unit at a remote location considerably reduces the space required immediately below the windshields for windshield wiper installations. It should be understood, however, that if desired, a windshield wiper might be connected to the shaft 39 of the control unit thereby reducing by one the total number of slave units needed for the complete installation.

Each of the slave units is preferably provided with spring loaded by-pass valves such as valves 91 and 92 of the slave unit 33. The valves such as 91 and 92 may be of any suitable construction such as that described below in connection with the remaining drawings and serve to allow fluid to by-pass the vanes when more than normal operating pressure is present, as may occur when a vane become stalled due to an obstruction preventing movement of the attached windshield wiper blade or when the wipers are being restarted after being parked as described below. Such relief valves are placed in suitable passageways in their respective blocks, such as 54, with the valve 91, for instance, being placed in a passageway 93 so as to allow one way passage of fluid from the passageway 58 to the passageway 57 while the valve 92 is positioned in a passageway 94 and serves to allow one way passage of fluid from the passageway 57 to the passageway 58. These valves are preferably adjustable as to the pressure at which they will allow passage of fluid through their respective passageways as described more completely below.

The embodiment of the invention represented diagrammatically in FIG. 1 includes a control unit and one or more slave units arranged in series relationship. It can be seen that the fluid pressure acting on the vane in each of the slave units will, therefore, depend not only upon the pressure of the fluid admitted to the system through the speed control valve, but also on the number of slave units used. The fluid entering the system may be under any suitable pressure and may of course be considerably in excess of the desired stall torque since the stall torque of each of the slave units may be varied by adjustment of the relief valves such as 91 and 92. In a typical aircraft installation using two slave units to operate windshield wipers, fluid may be admitted to the system through the speed control valve 31 at a pressure of about 800 p.s.i. and the pressure available for operating each of the slave units will therefore be about 400 p.s.i. It is contemplated that the construction of the slave units will be such that each shaft such as 52 and 62 may be capable of delivering about 100 inch-pounds of torque to its respective windshield wiper blade.

As shown in FIG. 1, each of the vanes 37, 51 and 61 may be a single vane, or if desired, any or all of these vanes may be double vanes, as hereinafter described, in order to balance the forces within each of the respective housings. The replacement of any of these vanes with double vanes (as in FIGS. 12-17) merely requires more connecting conduits or passageways and in no way affects the principles of operation described above, it being understood that the use of single or double vanes is a matter of choice in designing the specific apparatus to be used for each application.

In the operation of aircraft windshield wipers it is highly desirable to provide means for parking the wipers in a predetermined position when the pressure of the fluid entering the system falls below a predetermined value. In the apparatus schematically represented in FIG. 1, this power parking is obtained by means of a spring loaded parking piston 95 which is reciprocable within a housing 96. Fluid under pressure is admitted to act on an end of the piston 95 through a conduit 97 which is in communication with the fluid chamber 73 of the control unit. A spring 98 within the housing 96 acts to move the piston 95 in a direction opposing the action of the fluid under pressure admitted through the conduit 97. As shown in FIG. 1, the interior of the piston 95 is in fluid communication with the sump via a conduit 99, while an annular port 100 within the housing 96 is in communication with the conduit 78 via a conduit 101. It will be seen from FIG. 1 that when the pressure of the fluid admitted to the system exceeds the predetermined pressure, the pressure of the fluid passing through conduit 97 forces the piston 95 against the action of the spring 98 into the position shown in FIG. 1 in which the piston skirt prevents passage of fluid from the port 100 to the conduit 99. When the pressure of the fluid entering the system falls below the predetermined parking pressure the action of the spring 98 forces the piston 95 against the pressure of the fluid entering through conduit 97, thereby moving the piston in the direction of an arrow 102 so as to uncover the port 100 and enable fluid from the fluid conduit 101 to pass through the interior of the housing 96 and the conduit 99 to the sump.

The action of the parking piston described above may best be understood by assuming that the pressure of the fluid entering the system is reduced by means of the speed control valve 31 to below the predetermined parking pressure while the valve 35 is in the position shown in FIG. 1 and the vanes 37 and 51 are at an intermediate point of their counterclockwise movement, while the vane 61 is at an intermediate point of its clockwise stroke. When the fluid pressure is thus reduced, the piston 95 acts as described above to provide fluid communication from the conduit 101 through the port 100, the interior of the housing 96 and the conduits 99 and 81 to the sump. Under these conditions it will be apparent that counterclockwise movement of the vane 51 and clockwise movement of the vane 61 will immediately cease since the pressure from conduit 78 is released into the sump via the conduit 101 and there is, therefore, no motive force to actuate further movement of the vanes 51 and 61. The vane 37, however, continues its counterclockwise stroke under the influence of the fluid under pressure entering the chamber 41 through the passageway 43 and as it nears the end of the counterclockwise stroke, actuates the valve 35 as described above. The valve 35 then rotates so that fluid under pressure is being delivered to the conduit 80 rather than the conduit 77 and becomes positioned so as to allow fluid from the conduit 77 to drain to the sump as described above. As in normal operation, the fluid under pressure passing through conduit 80 and passageway 67 then acts to force the vane 61 in a counterclockwise direction and the fluid thereby displaced acts to move the vane 51 in a clockwise direction. Unlike normal operation, however, displacement of fluid from the chamber 55 of the slave unit 33 does not act to move the vane 37 in a clockwise direction since such fluid is free to pass from conduit 78 to the sump via conduit 101, port 100 and conduits 99 and 81. Since, under these conditions, the vane 37 does not move to its clockwise position, the valve 35 is not actuated to its other position and continues to deliver the fluid under pressure to the conduit 80. The vanes 51 and 61 are thus held in their extreme clockwise and counterclockwise positions respectively and their attached windshield wipers are in turn held in this parked position by the action of the fluid under pressure entering the system. If desired, mechanical parking means such as described below in connection with the remaining drawings may be used to retain the vanes 51 and 61 in the parked position until the fluid pressure entering the system is raised again to greater than the predetermined parking pressure.

When the pressure of the fluid entering the system is again raised to greater than the predetermined parking pressure, as for instance by opening the speed control valve 31, the action of such fluid passing through conduit 97 forces the piston 95 back to the position shown in FIG. 1, in which fluid is no longer free to pass from port 100 to the sump. This effectively cuts off the flow of fluid from conduit 78 to the sump. At this point the fluid pressure in the system must be raised to the point where the by-pass relief valves such as 91 and 92 may operate to allow such fluid to by-pass the vanes 51 and 61. When the pressure of the fluid entering the system and passing through the conduit 78 is raised this high, fluid by-passes the vanes 51 and 61 and passes through the conduit 78 and passageway 44 to the fluid pressure chamber 42 of the control unit. Under the action of this pressure the vane 37 starts its clockwise stroke and as it nears its extreme clockwise position actuates the valve 35, at which time the valve 35 rotates to the position shown in FIG. 1 and normal operation of the system as described above is resumed.

*Master Control Unit*

FIGS. 2-9 show a control unit 111, which is similar in operation to the control unit 32 described above. As best shown in FIGS. 3 and 4, the control unit 111 includes a housing 112 provided at one end with threaded holes 113 for mounting the housing in position in an aircraft cockpit. A valve 114 is mounted for oscillation in the upper portion of the housing 112 while a control vane 115 is mounted on or formed integrally with a shaft 116 (see also FIGS. 6-7) for oscillation within the lower portion of the housing 112. The valve 114 and vane 115 perform the same functions as described above in connection with the valve 35 and vane 37 and the space within which the vane 115 oscillates in the housing 112 is defined by a spacer such as block 117 which performs a function similar to that of the block 40 described above. The block 117 is retained in position within the housing 112 by an end cover such as screw plug 118 which is threadingly engaged in the housing 112 and preferably secured therein by a thread lock 119. An O ring 120 is preferably provided for preventing leakage of fluid around the cover plate 118. The other end of the housing 112 is closed by a plug or cover plate 121 threadingly engaged in the housing as at 122 and is preferably provided with an O ring 123 for preventing escape of fluid from the housing.

As best shown in FIG. 6, the space within which the vane 115 oscillates is divided by the vane into fluid pressure chambers 131 and 132 which are analogous to the fluid pressure chambers 42 and 41 respectively shown in FIG. 1. In order to prevent leakage of fluid from the chambers 131 and 132 and to expedite oscillation of the vane 115, a washer 133 (FIG. 3) is preferably positioned between the upper portions of the block 117 and vane 115 and the housing 112. In order to facilitate oscillation of the vane 115 the shaft 116 preferably rotates within a bushing 134 which serves to space the shaft from the washer 133. A pin 134' is preferably positioned within the block 117, as best shown in FIGS. 3 and 6, and the pin 134' serves as a seal and roller bearing to facilitate oscillation of the vane 115 while at the same time preventing leakage of fluid between the chambers 131 and 132.

As best shown in FIG. 5 the lower portion of the valve 114 has cut-away portions which form fluid chambers 135, 136, 137 and 138, the valve 114 also has an annular recess forming a fluid chamber 139 (FIG. 3). The fluid chambers 135 and 136 (FIG. 4) extend to the end of the valve while as shown in FIG. 3, the fluid chambers 137 and 138 do not extend to the end of the valve. Also, as best shown in FIG. 5 the body 112 is provided with fluid passageways 141 and 142 which may be conveniently formed by drilling from the outside of the housing and plugging the outer ends of the drilled holes by suitable means such as plugs 143. As shown in FIGS. 4 and 5, passageway 141 is in communication with a passageway 144 while passageway 142 is in communication with a passageway 145. The passageway 144 extends through the housing 112 and is in communication with a fluid port 146 while the passageway 145 extends through the washer 133 and block 117 (FIG. 6) and is in communication with the fluid chamber 132. In addition to the fluid port 146, the housing 112 is also provided with fluid ports 147, 148 and 149 (FIGS. 3 and 4) as well as other fluid passageways described below.

In operation, fluid under pressure after passing through a suitable speed control valve, such as the valve 31 described above, enters the fluid port 147 of the housing 112 through a suitable conduit, such as the conduit 75 shown in FIG. 1. From the port 147, the pressure fluid passes through a passageway 151 (FIG. 3) to the chambers 137 and 138 via the chamber 139. With the valve 135 in the position shown in FIGS. 3–5, the pressure fluid passes from the chamber 137 through passageways 141 and 144 to the port 146 which is in communication with a slave unit such as the slave unit 34 in FIG. 1, by means of a connecting conduit such as the conduit 80 shown in FIG. 1. The passage of this pressure fluid to the slave unit actuates the vanes of the one or more slave units being used in the system such as the slave units 33 and 34 described above and results in displaced fluid being returned to the port 149 of the control unit 111 through a suitable conduit such as the conduit 78 of FIG. 1.

From the port 149 (FIGS. 3 and 6), the displaced fluid passes through a passageway 152 and a passageway 153 to the chamber 131 of the control unit. The passageway 152 is formed continuously through the housing 112, washer 133 and block 117, while the passageway 153 is formed in the block 117. An aligning pin 117a (FIG. 6) fits in cooperating recesses in the block 117, the washer 133 and the housing 112 to hold these components in alignment, thereby preventing rotation of the block relative to the housing. The pressure of displaced fluid entering the chamber 131 forces the vane 115 in a counterclockwise direction as best shown in FIG. 6. This counterclockwise movement of the vane 115 in turn displaces fluid from the chamber 132 and such fluid passes through conduits 145 and 142 to the chamber 136. As best shown in FIGS. 4 and 5, fluid from the chamber 136 is free to pass through a passageway 154 to the fluid port 148 of the control unit from which it may return to the sump through a suitable conduit such as the conduit 81 of FIG. 1.

As the vane 115 nears the extreme limit of its clockwise stroke, the valve 114 (FIG. 5) is actuated in a manner described below and rotates in a counterclockwise direction until the chamber 137 of the valve is in communication with the passageway 142 rather than the passageway 141. This same rotation moves the chamber 136 out of communication with the passageway 142 and moves the chamber 135 into communication with the passageway 141. When this happens the pressure fluid instead of passing from the chamber 137 through the passageway 141, passes from the chamber 137 through the passageway 142 and the passageway 145 into the chamber 132. The entrance of the pressure fluid into the chamber 132 forces the vane 115 in a clockwise direction. Such clockwise movement of the vane 115 displaces fluid from the chamber 131 through the passageways 153 and 152 to the port 149 of the control unit. From the port 149 such displaced fluid passes through a suitable conduit such as the conduit 78 of FIG. 1, to a slave unit such as the slave unit 33 of FIG. 1. In a manner similar to that described in connection with FIG. 1, such displaced fluid operates the vanes of one or more slave units and such movement in turn displaces fluid from the slave units as described above. Such displaced fluid from the slave units passes through a suitable conduit such as the conduit 80 of FIG. 1 to the port 146 of the control unit 111. From the port 146 the displaced fluid passes through passageways 144 and 141 to the chamber 135. Suitable means are provided for passing fluid between the chamber 135 and the chamber 136. As shown in the drawings, such communication between the chambers 135 and 136 may be accomplished by allowing sufficient vertical clearance in positioning the valve 114 within the housing 112 so that fluid may pass freely around the end of the valve to which the chambers 135 and 136 extend or such communication may be provided by a suitable passage through the valve and communicating with both of the chambers 135 and 136. Displaced fluid passing into the chamber 135 therefore passes on to the chamber 136 and from there passes through the passageway 154 to the port 148 from which it passes to the sump as described above. When the vane 115 approaches the limit of its clockwise stroke, the valve 114 again rotates to the position shown in FIG. 5 and the entire cycle is repeated.

It will be apparent from the above description that in order to provide rapid and positive wiping action, it is essential that the valve 114 operate between the positions described above with a positive and rapid action and that such action must take place only at the proper times. In particular, it is essential that the rotation between the position shown in FIG. 5 and the position in which the fluid chamber 137 is in communication with the passageway 142, as well as the reverse operation, must take place without any appreciable period of time during which fluid pressure is being transmitted to neither one of the passageways 141 and 142. Such dead spots may result not only in pauses of the wiper blades at the ends of their strokes, but also in stalling of the complete system, since movement of the valve 114 is dependent on fluid under pressure being available to move the vane 115, and in the absence of mechanism such as that described below, the control valve could well become stalled in an intermediate position, thereby completely stopping the operation of the entire system. The mechanism for actuating the valve 114 includes a resilient torsion member shown here as a torsion bar 161 (FIGS. 6, 7 and 8) located within a hollow central portion of the shaft 116. One end of the torsion bar 161 is positioned in a longitudinal slot cut in the end of a retaining pin 162 as indicated at 163. The retaining pin 162 is in turn retained in place and restrained against rotation with respect to the shaft 116 by a locking pin 164 passing through the shaft and the retaining pin, as best shown in FIG. 4. As indicated at 165, the other end of the torsion bar 161 is positioned in a longitudinal slot cut in a collar 166 which is preferably integral with a key 167. The key 167 is in turn positioned within a longitudinal slot 168 cut in the end of the shaft 116 with the slot 168 being somewhat wider than the key 167, thereby permitting a limited amount of rotation of the key 167 with respect to the shaft 116 as described below. Fixed pins 171 and 172 project from the end of the valve 114 as indicated in FIG. 4 and are adapted to engage the respective ends of the key 167 as described below.

As best shown in FIGS. 4 and 5, yieldable stop means are provided for restraining movement of the valve 114 until the torsion bar 161 has been loaded as described below, sufficiently to snap the valve to its alternate position with sufficient speed to avoid any substantial period of time during which the valve is not in position to admit pressure fluid to either of the passageways 141 and 142. Such a yieldable stop mechanism may take the form of detent means as shown in the drawings and include rollers 173 and 174 which are positioned in interposed recesses in the interior of the housing 112 adjacent the valve 114. Spring loaded detent pistons 175 and 176 cooperate with the rollers 173 and 174 to provide the desired degree of restraint against rotation of the valve. The detent pistons 175 and 176 are mounted in a suitable recess in the valve 114 and are urged apart by a spring 177. It will be apparent that while the spring 177 urges the detent pistons outwardly with sufficient strength to prevent rotation of the valve 114 counterclockwise from the position shown in FIG. 5, such rotation can be accomplished if sufficient force is employed to overcome the urging of the spring 177.

For a better understanding of the operation of the torsion bar 161 and the detent means described above, reference should be had to FIGS. 9 through 9c. FIG. 9 shows the relative position of the key 167, slot 168, pins 171 and 172 and rollers 173, 174 when the vane 115 is at approximately the mid-point of its counterclockwise stroke. At this time the valve 114 is in the position shown in FIG. 5. While the detent pistons 175 and 176 are not shown in FIGS. 9 through 9c, it will be understood that they are located at all times approximately in the same angular position as fixed pins 171 and 172. As the counterclockwise rotation of the vane 115 progresses, the slot 168, torsion bar 161 (FIG. 8) and key 167 all rotate with the shaft 116 (FIG. 7) of the vane 115 to approximately the position shown in FIG. 9a. At this point in the counterclockwise movement of the vane 115, the ends of the key 167 come into contact with the pins 171 and 172 as shown. Since rotation of the valve 114, and therefore angular movement of the pins 171 and 172, is restrained by the action of the detent pistons 175 and 176 against the rollers 173 and 174, further angular movement of the key is temporarily prevented. Further rotation of the vane 115 in the counterclockwise direction results in movement of the vane and therefore the slot 168 without corresponding movement of the key 167. This results in the torsion bar 161 being twisted or tensioned during such further rotation of the vane 115 until the sides of the key 167 come into contact with the sides of the slot 168 as shown in FIG. 9b. It should be understood that the amount of tensioning which the torsion bar undergoes during this phase of the rotation of the vane 115 depends upon the initial clearance between the sides of the key 167 and the walls of the slot 168. When the relative positions shown in FIG. 9b are reached, the torsion bar cannot be twisted any further due to the action of the side walls of the slot 168 on the key 167 and the key is said to be locked across the slot. At this time further rotation of the vane 115 in the counterclockwise direction moves the detent pistons 175 and 176 inwardly against the action of the spring 177 (FIGS. 4 and 5) so that the valve 114 rotates in a counterclockwise direction until the detent pistons 175, 176 are fully retracted against the action of the spring 177 and are in alignment with the rollers 173, 174. At approximately this point the extreme counterclockwise position of the vane 115 is reached and rotation of the valve 114 brings the chamber 137 out of communication with the passageway 141. At this position of the valve 114 since the chamber 137 to which pressure fluid is directed is not in communication with either of the passageways 141 or 142, the valve 114 is in a dead center position from which without the aid of the torsion bar 161 there would be no further forces acting to urge the valve to the position in which the chamber 137 is in communication with the passageway 142 to reverse the stroke of the vane 115. However, since the torsion bar 161 is at this point under tension, the stored energy in the torsion bar serves, once the urging of the spring 177 has been overcome, to snap the valve 114 in a counterclockwise direction to the position past dead center in which the chamber 137 is in communication with the passageway 142. As this movement is completed, the parts are disposed as illustrated and the pressure fluid passing through the conduit 142 and on to the chamber 132 as described above acts to begin the clockwise stroke of the vane 115. It should be understood that as the vane 115 nears the extreme limit of its clockwise stroke, the valve 114 is actuated by a sequence of reverse steps analogous to that described immediately above. In this way the movement of the vane 115 and hence of the windshield wipers attached to the slave units is positively controlled and there is not an appreciable and undesirable time lag between the ending of one stroke and the beginning of the next.

*Slave Unit*

FIGS. 12 through 22 show a slave unit 211 which is analogous in operation to the slave units 33 and 34 shown in FIG. 1. It should be understood that in a particular installation such as that shown schematically in FIG. 1, one or more such slave units may be used depending upon the number of windshield wipers it is desired to operate by means of slave units and the operation of such a system will be analogous to the operation of the system shown in FIG. 1 as described above. As best shown in FIGS. 12 through 15 and 17, the slave unit 211 includes a housing 212 within which is a bobbin 213. The bobbin 213 (FIG. 17) has an end portion 214, another end portion 215 with an extending collar 216 and spacer portions 217 and 218. The spacer portions and extending collar are preferably integral with the bobbin 213. An inner shaft 219 fits within the bobbin 213 and is secured to an outer shaft 220 as by a pin 221 passing through aligned holes 222, 223 in the inner shaft and outer shaft, respectively. The inner shaft 219 is provided with a slot 224 adapted to receive a double vane 225 which divides the space within the bobbin 213 and surrounding the inner shaft 219 into fluid pressure chambers 226, 227, 228 and 229, with the spacer portions 217 to 218 defining the approximate limits of oscillation of the vane 225 in response to the action of pressure fluid as described below. As best shown in FIGS. 13, 14, 16 and 17, the vane 225 is provided with a passageway 230 which is in communication with the chamber 226 and the chamber 228 and also is provided with a passageway 231 which is in communication with the chamber 227 and with the chamber 229. By thus insuring free flow of fluid between the chambers 227 and 229 and between the chambers 226 and 228, the necessity for duplicating the passageways to be described below through which fluid is conducted into and withdrawn from these chambers is eliminated and the forces acting within the chambers are dynamically balanced with respect to the unit as a whole.

As best shown in FIGS. 13 and 15, the bobbin 213 is held in place in the housing 212 by an end cover plug 235 which is threadingly engaged in the housing as indicated at 236. An O-ring 237 is preferably provided for insuring against leakage of fluid through the thread joint 236 while another O-ring 238 may be positioned in a suitable recess around the outer shaft 220 to prevent leakage of fluid between the shaft and the end cover plate.

The outer end of the outer shaft 220 may be splined as at 239 for receiving the operating arm 242 of a windshield wiper as indicated in FIG. 21, while the extreme outer end of the outer shaft 220 is threaded as at 240 for receiving a locking nut 241 to retain the operating arm 242 in position. If desired, a washer 243 (FIG. 15) may be inserted around the outer shaft 220 between the end of the collar 216 and the end cover plate 235.

As best shown in FIGS. 15, 17 and 19, suitable apertures are provided in the housing 212 and spacer portions 217 and 218 of the bobbin 213 for receiving a pair of relief valve assemblies 251 and 252 for controlling the flow of fluid within the slave unit 211 as described below. These relief valve assemblies are similar in function to the relief valves 91 and 92 shown in FIG. 1. As best shown in FIGS. 15 and 19, the relief valve assembly 252 includes a threaded insert sleeve 253, the threads of which are adapted to engage internal threads of the housing 212 so as to make the insert 253 adjustable with respect to the depth to which it is screwed within the housing as by means of a conventional slotted head as indicated at 254. A "O" ring 255 is provided around the head portion of the sleeve 253 and the sleeve 253 is shaped to provide an axial central passageway 256 and radial passageway 257 connecting the central passageway 256 with an annular fluid chamber 259 in the housing 212 as best shown in FIGS. 18 and 15. The end of the sleeve 253 opposite the head 254 is recessed to receive one end of a spring 260. The other end of the spring 260 is disposed in a bore in a poppet valve head 261 which is normally urged against a valve seat formed by a shoulder 262 of the spacer portion 218. Therefore, by adjusting the head 253 axially the compression of spring 260 may be varied so as to vary the pressure at which the poppet 261 operates. The bore in the spacer portion 218 in which the relief valve assembly 252 is disposed extends beyond the shoulder 262 in a reduced diameter 263 (FIG. 19) and communicates with the chamber 226 via a passageway 264. The central passageway 256 is in communication with the chamber 227 by means of a passageway 265. As best shown in FIG. 15, a thread lock 266 is provided for retaining the adjustable sleeve 253 in the desired position. However, as a matter of precaution, the heads 254 and 271 are preferably secured in place by a safety wire (not shown).

The relief valve assembly 251 (FIG. 15) is similar to the assembly 252 described immediately above and includes, for instance, a central passageway 267 which is in communication with an annular fluid chamber 268 in the housing 212 by means of radial passageways 269 in an adjustable sleeve 270 having a slotted head portion 271. The assembly 251 also includes a poppet valve head 272 urged against a valve seat formed by a shoulder 273 of the housing 212 by a spring 274. The passageway 267 of the assembly 251 is in communication with the chamber 228 by means of a suitable passageway 265' (FIG. 17) similar to the passageway 265 and is in communication with the chamber 229 through a suitable passageway similar to the passageway 264.

It will be apparent that the springs 260 and 274 serve to hold the poppet valve heads 261 and 272 firmly against the shoulders 262 and 273, thereby preventing passage of fluid between the chambers 229 and 228 or between the chambers 226 and 227 so long as the force of the springs is sufficient to hold the poppet valve head in place. However, if the pressure fluid within the chambers 229 or 226 should become sufficient, the urging of the springs 260 or 274 may be overcome. If, for example, the pressure fluid in the chamber 226 becomes sufficiently great, the poppet valve head 261 will be urged away from the shoulder 262, thereby allowing the fluid to pass from the chamber 226 through the passageways 264 and 265 and into the chamber 227. Likewise, a sufficiently high pressure in the chamber 229 will result in fluid being able to pass through the relief valve assembly 251 into the chamber 228. The relief valves 251 and 252 are therefore suitable for allowing fluid to flow through the slave unit even though the movement of the vane 225 may be prevented as by stalling of the associated windshield wiper blade or by having the vane in a parked position as described below. With this arrangement, one windshield wiper of a series may be stalled, as for instance due to a buildup of ice, without affecting the operation of the remaining wipers providing only that the system have sufficient pressure to operate the appropriate by-pass relief valves such as 251, 252.

The normal operation of the slave unit 211 is as follows. During one direction of movement of the associated control vane such as during the movement of the vane 115 shown in FIG. 6 in a counterclockwise direction, pressure fluid is passed to the slave unit through a suitable conduit such as the conduit 80 shown in FIG. 1, such fluid enters the slave unit 211 (FIGS. 18 and 19) through a fluid port 281 and passes through a passageway 282 through the annular chamber 259, radial passageways 257, central passageway 256 (FIG. 15) and passageway 265 (FIG. 19) into the chamber 227. It is apparent that such pressure fluid is also conducted through the passageway 231 to the chamber 229. The action if the pressure fluid in the chambers 227 and 229 forces the vane 225 in a clockwise direction with reference to FIGS. 12 and 14. Such clockwise movement of the vane 225 necessarily results in similar clockwise movement of the attached outer shaft 220, thereby actuating the attached windshield wiper. The clockwise movement of the vane 225 also displaces fluid from the chambers 226 and 228. Due to the above mentioned passageway 230, fluid from the chamber 226 is free to pass to the chamber 228. From the chamber 228 such displaced fluid passes through the relief valve assembly 251 to the annular chamber 268 (FIG. 15) and from there through a passageway 283 (FIG. 18) to a fluid port 284 from which it may pass for instance to another slave unit through a conduit such as the conduit 79 shown in FIG. 1. Upon reversal of the control vane such as when the vane 115 begins to move in a clockwise direction with reference to FIG. 6. Such clockwise movement of the vane 115 forces fluid through the port 149 of FIG. 3. If desired, such pressure fluid may be used to operate a slave unit such as the slave unit 33 shown in FIG. 1, and displaced fluid from such slave unit may pass through a conduit such as 79 to the port 284 of the slave unit 211. During this part of the cycle the pressure fluid passes through the passageway 283 and relief valve assembly 251 to the chamber 228 and through passageway 230 to the chamber 226, thereby forcing the vane 225 in a counterclockwise direction with relation to FIG. 14. Such counterclockwise rotation of the vane 225 in turn displaces fluid from the chambers 227 and 229 and such displaced fluid passes through the relief valve assembly 252 and passageway 282 to the port 281 from which it is returned through a conduit such as the conduit 80 of FIG. 1, or passed to operate another slave unit.

*Mechanical Parking*

In order to provide means for parking the windshield wiper attached to the slave unit 211 in a predetermined position when system pressure drops below a predetermined parking pressure, parking pins 291 and 292 may be provided as best shown in FIGS. 18 and 20. As shown in FIG. 20, the parking pins fit within suitable cooperating openings 293 and 293' in the housing 212 and the openings 293 and 293' are vented to atmosphere by passageways 294 and 294' which permit the parking pins to move freely within the openings 293 and 293' without creating a vacuum or suction effect. The parking pins are provided with O-rings 295 and 295' to prevent leakage of fluid around the parking pins. As best shown in FIG. 17, the inner shaft 219 is provided with partial recesses 296 and 297 which are adapted to cooperate selectively with partial recesses 298 and 299, respectively, in the bobbin 213 to provide recesses adapted to receive the parking pins 291 and 292, respectively. As best shown in FIG. 20, a spring 300 is positioned within the space 293 and acts to urge the parking pin 291 into the recess formed jointly by the partial recesses 297 and 299 in register and at which time the partial recesses 296 and 298 are out of register. As best shown in FIG. 18, passageways 301 and 302 connect the portions of the spaces 293 and 293' within the housing 212 surrounding the ends of the parking pins 291 and 292, respectively, with the ports 284 and 281, respectively; the pressure fluid being permitted to pass into the spaces 293 and 293' due to sufficient clearance around the pins 291 and 292. System pressure therefore acts on the parking pins 291 and 292, tending to force the pins out of the recesses formed in the inner shaft and bobbin as described above. So long as the force of the system pressure acting to urge the parking pin 291 out of the recess formed by the partial recesses 297 and 299 is sufficient to overcome the force of the spring 300, the parking pin will remain out of the recesses and the slave unit will operate as described above. If, however, the system pressure falls below the predetermined parking pressure, as determined by the strength of the spring 300, the spring 300 will force the parking pin 291 into the recess (FIGS. 18a and 20) resulting when the partial recess 297 is in alignment with the partial recess 299. By a proper placement of the partial recesses with respect to each other, the pin 291 is free to go to the position shown in FIG. 20 only when the vane is at a predetermined extreme position of movement. If springs are provided in both of the spaces 293, it is apparent that the position at which the windshield wiper will become parked is purely a matter of chance and since this is usually undesirable, it is preferred to place a spring 300 in only one of the spaces such as 293 and 293'. The other parking pin such as 292 is then free to move within the space 293' but since any small amount of system pressure will be sufficient to prevent the pin 292 from falling into its recess formed by the partial recesses 297 and 299, the slave unit will always park with the pin 291 in its recess as shown in FIG. 20 and the windshield wipers may thus always be parked in the same position. Two pins 291 and 292 are provided so as to facilitate selecting the desired parking position by merely placing the spring 300 in the proper pin at the time of installation. Once the spring 300 has pushed the parking pin 291 into the position shown in FIG. 20, the vane 225 and hence the attached windshield wiper blade will be locked in the parked position so long as the system pressure remains less than the predetermined parking pressure. The windshield wipers must thus be mechanically locked in the parked position and will remain in the parked position even though the system pressure should fail completely. Such positive mechanical parking is desirable since in the event of complete pressure failure, it would be highly undesirable to allow the windshield wipers to move under reaction of outside influences such as air flow across the windshield.

*Power Parking*

As described above in connection with FIG. 1, it is highly desirable to provide means whereby the windshield wipers operated by the slave units such as 33 and 34 may be parked in a predetermined position upon reduction of the system pressure to less than a predetermined parking pressure. Such power parking is in addition to the positive mechanical parking provided by the parking pin such as 291 described immediately above and the predetermined parking pressure for power parking is conveniently set at a slightly higher value than the predetermined parking pressure for the operation of the parking pin such as 291. In the embodiment shown in FIGS. 2 through 9c and 12 through 22, such power parking may be accomplished by the use of a parking piston 311 (FIG. 3) which is analogous in operation to the piston 95 shown in FIG. 1.

As best shown in FIG. 3, the parking piston 311 is positioned in a central cylinder cavity 315 of the valve 114. An adjusting sleeve 312 is threadingly disposed within the outer end of the cavity 315 and the thread lock 313 is preferably provided for securing the sleeve 312 in adjusted position. The adjusting sleeve 312 is provided with an end portion 312a which projects slightly beyond the end of the valve 114 and preferably bears against an insert such as 121a in the cover plate 121, thereby providing a suitable bearing for oscillation of the valve within the housing. If desired, the projecting portion 312a may bear directly against the cover plate 121 but the use of an insert such as 121a allows the cover plate 121 to be made of softer material than the insert. For instance, the cover plate 121 as well as the housing 112 and cover plate 118 may be of aluminum, while insert 121a may be of steel or other suitable material. The projecting portion 312a and insert 121a are preferably positioned so that a space 321 is formed between the valve 114 and the cover plate 121. For the reasons discussed below, the space 321 should completely separate the valve 114 from the cover plate 121. An O-ring 316 is preferably provided for preventing leakage of fluid around the parking piston 311.

The pressure fluid entering chambers 137 and 138 (FIG. 5) from the port 147 (FIG. 3) as described above, is in direct communication with the end of the piston 311 adjacent the inner end 317 of the cavity 315 via fluid passageways 318 and 319. It is thus apparent that the action of the fluid under pressure passing through the passageways 318 and 319 and thence between the end of the piston 311 and the end 317 of the cavity 315 urges the piston 311 away from the end 317 against the force of the spring 314. In order to facilitate the admission of fluid through the fluid passageways 318 and 319, the lower end of piston 311 is preferably rounded.

The piston 311 is shown in FIG. 3 in the position which it occupies when the pressure of the fluid entering through the port 147 is less than the predetermined parking pressure. The compression of the spring 314 may be varied by adjusting the sleeve 312 to vary the effective parking pressure at which the spring 314 will overcome the urging of the pressure fluid and will move the piston 311 to the position shown in FIG. 3. In the position shown in FIG. 3, the cavity 315 is in communication with the port 149 by means of a passageway 322 and annular groove 323 in the valve 114 and passageways 324 and 325 in the valve 114. The upper end 326 of the piston 311 is so positioned and/or so shaped that the passageways 324 and 325 are in communication with the cylinder cavity 315 only when the piston is in the lower position shown in FIG. 3, that is, when the fluid pressure in the chambers 137 and 138, and therefore the pressure of the fluid acting to force the piston 311 away from the end 317, is less than the predetermined parking pressure as determined by the spring 314. However, when such fluid pressure is greater than the predetermined parking pressure the piston 311 is forced outwardly, thereby shutting off the passageways 324 and 325 from communication with the cavity 315. It is thus apparent that while the normal full system pressure is being maintained above the predetermined parking pressure the passageways 324 and 325 serve no purpose whatsoever and the operation of the system is entirely as described above.

On the other hand, when the system pressure falls below the predetermined parking pressure and the spring 314 acts to move the piston 311 to the position shown in FIG. 3, fluid from the port 149 is free to pass through the passageways 324 and 325 into the cavity 315, and into the space 321 through the holes 327 in the end of the adjusting sleeve 312. As above described, the space 321 is in communication with a passageway 328 which in turn is in communication with the port 148 which in turn is in communication with a source of hydraulic fluid such as a fluid sump. The effect of this situation on the system is analogous to the situation described in connection with FIG. 1 above in which the passageway 101 was placed in communication with the passageway 99 by a drop in the system pressure to less than the predetermined parking pressure. To understand the effect on the system of positioning the parking piston 311 as shown in FIG. 3, we may assume that such postioning occurs while the vane 115 is moving in its counterclockwise direction with reference to FIG. 6. In describing the operation of the parking piston 311, it will be assumed that a system analogous to that shown in FIG. 1 but employing only one control unit and one slave unit, i.e., the control unit 111 and the slave unit 211, is used, it being understood that additional slave units may be used in the manner indicated by FIG. 1. In such a system the port 146 of the control unit 111 may be connected with the port 281 of the slave unit 211 by a suitable conduit analogous to the conduit 80 of FIG. 1, while the port 149 of the control unit may be connected to the port 284 of the slave unit by a suitable conduit analogous to the conduit 78 of FIG. 1. As described above, when the vane 115 is moving counterclockwise with reference to FIG. 6, pressure fluid is passed to slave unit 211 through port 146 and in the system presently being described, enters the port 281 of the slave unit 211, thereby forcing the vane 225 of the slave unit in a clockwise direction (with reference to FIG. 14). As described above, clockwise movement of the vane 225 forces fluid from the chambers 226 and 228 out through the port 284 which in the sytsem being described is in communication with the port 149. Since in the situation under consideration the system pressure is below parking pressure, fluid from the port 149 is free to pass as described above to the port 148 and thence to the sump, and such fluid does not therefore act as described above to force continuation of the counterclockwise movement of the vane 115. In the absence of such pressure forcing continuation of the counterclockwise movement of the vane 115, it is apparent that the valve 114 will not operate as described above to reverse the flow of fluid so as to initiate a clockwise movement of the vane 115. The system pressure will therefore force the vane 225 to its extreme clockwise position, in which in the absence of a reversal of the valve 114 the vane 225 will remain so long as the fluid pressure remains below the predetermined parking pressure. As described above, mechanical parking means are preferably provided for locking the vane 225 in the parked position. The extreme clockwise position of the vane 225 in reference to FIG. 14, is of course, the extreme counterclockwise position with respect to FIG. 20.

If the system pressure should fall below the predetermined parking pressure and thereby enable fluid to pass from the port 149 to the port 148 while the vane 115 is moving in a clockwise direction then clockwise movement of the vane 115 would be completed because the fluid acting to force the vane 115 in a clockwise direction is not in communication or is not free to pass to the port 149. Upon rotation of the valve 114 to the position in which the valve 115 is normally forced in a counterclockwise direction, however, the operation of the system would be as described immediately above with the result that the vane 225 of the slave unit would come into the parked position as shown in FIG. 20. When system pressure again rises above the predetermined parking pressure, the urging of the spring 314 is again overcome and the piston 311 moves to close the passageways 324 and 325 from communication with the cavity 315, thereby preventing the flow of fluid between the port 149 and the port 148. This of itself does not, however, initiate resumption of normal operation since the pressure fluid is still tending to force the vane 225 in a clockwise direction with reference to FIG. 14 and since the vane 225 is already in the extreme clockwise direction there is no fluid displacement from the slave unit tending to move the vane 115. In order to resume normal operation of the system, it is necessary that the system pressure become great enough to actuate the by-pass relief valve 252, thereby enabling fluid to pass through the slave unit via the passageways 264 (FIGS 15 and 19), 230 (FIGS. 14 and 17) and thence through the passage 265' and relief valve 251 passageway 283 (FIG. 18) to the port 284 from which it passes to the port 149 (FIG. 3) of the control unit. With pressure fluid thus admitted to the port 149 and therefore via the passageways 152 and 153 to the chamber 131 (FIG. 6), the vane 115 is forced in a counterclockwise direction and when the vane 115 reaches its extreme counterclockwise position, the valve 114 will be actuated, thereby initiating normal operation of the system.

*Modified Power Parking*

In the modified control unit shown in FIGS. 10 and 11, the structural features and operation are in large part the same or similar to those above described with reference to FIGS. 2–9c, and in order to avoid undue repetition the corresponding parts in FIGS. 10 and 11 will be designated with the same last two digits used in FIGS. 2–9c, with the 4 prefix added and only the basic differences in structure will be described in detail. For example, the modified unit, designated in general as 411, comprises a housing 412, a spacing block 417, a vane 415, a pressure fluid passage 447, a slave unit passage 449, all as described and which operate in the manner above set forth relative to the unit 111 (FIG. 3) and parts thereof 112, 117, 115, 147 and 149. The rotary valve 414 is provided with detents engageable with stops, such as the detents 175 and 176 and stops 173 and 174 above described relative to the unit shown in FIGS. 4 and 5.

The chief distinction resides in the modification of the power parking means per se. In the modified structure the torsion bar 461 carries a modified key 467 having one end 467a constructed and disposed to engage a stop 471 in a manner similar to that above described relative to FIGS. 9–9c and the other end having an inclined ramp or cam face 467 b. Instead of the parking features designated 311—326 of FIG. 3, the device of FIGS. 10 and 11 employs the pin 471 which is slidably disposed in valve 414 parallel to its axis and is urged outwardly by a spring 471a and in its outermost position its inner end is near the top of the cam 467b. At all times the pin 471 is disposed for operative engagement with the key end 467a. The pin is urged inwardly by system pressure fluid entering opening 447 and when a predetermined pressure is exerted the pin is moved inwardly to its fully extended extreme inner position where it is disposed near the bottom of the cam 467b.

When the inner end of the pin 471 is at its extreme inner position, it is engaged by the end 467a of the key and the parts function exactly as above described in connection with FIGS. 9–9c during the counterclockwise movement and the vane 415 is caused to reverse its counterclockwise stroke and move in a clockwise direction as shown in FIG. 9c; and to again repeat the reverse cycle so long as predetermined fluid pressure is maintained. However, as the fluid pressure decreases, the pin 471 will be moved outwardly and this will vary the timing of effective engagement with the cam end 467b of the key 467 so that on the clockwise stroke, if the pressure decreases sufficiently, the pin 471 will engage the key end 467b too late to effect the reversal; and the vane will therefore park at the end of the clockwise stroke.

Upon increased system pressure the mechanical lock (if employed on the slave unit as in FIGS. 18–18a) is first released and at a higher pressure the pin 471 is forced inwardly against the cam face 467b, which causes the valve 414 to cam itself into reversed position and thereupon full wiping action is resumed. It will be understood that the speed of operation of the wiping blades is controlled at will by adjusting the control valve such as 31 (FIG. 1). The more the valve is opened the higher the flow and the greater the number of strokes per minute of the wipers.

From the foregoing it will be understood that our invention is especially useful as applied to windshield wiper systems for aircraft and is adaptable to various combinations such as:

(1) Individual master units at each window with separate controls so that both pilot and copilot adjust wiper speeds to their convenience.
(2) A master unit and a slave unit with a single control regulating the speed of both wipers and maintaining complete synchronization of the individual power requirements.
(3) A master unit used as a displacing motor (control valve) supplying one or more, usually two, slave units and maintaining synchronous operation between all units.

In the present embodiments the units are designed for a nominal system pressure of 3,000 p.s.i. However, the pressure required for maximum normal wiping is very low. Actually, it is possible on the slave units to adjust the maximum stall torque by simple adjustment of the bypass relief valves within the slave unit.

Another basic advantage of this wiper system, besides the above stated versatility, is the small size of the components and the further gains achieved as the number of window units increase. Along with the advantage of size, of course, is weight. It is believed that this system is much smaller and lighter than any existing systems, even though the other systems deliver much less wiping power.

Having thus described our invention with particular reference to the preferred form thereof and having shown and described certain modifications, it will be obvious to those skilled in the art to which the invention pertains, after understanding our invention, that various changes and other modifications may be made therein without departing from the spirit and scope of our invention, as defined by the claims appended thereto.

What we claim is:

1. In apparatus of the character described the combination of a control unit and a slave unit each having a pressure fluid power chamber, each of said chambers having a power vane disposed therein for angular oscillating movement, each of said chambers having fluid ports positioned on opposite sides of its power vane respectively, valve means operable by the angular movement of the power vane of said control unit chamber for controlling the alternate flow of fluid under pressure to the opposite sides of its said vane, means for passing fluid between said valve means and the fluid port on one side of the vane of said control unit chamber, means for passing fluid between the fluid port on the other side of said control unit vane and the fluid port on one side of said slave unit vane, means for passing fluid between the fluid port on the other side of said slave unit vane and said valve means, and means interconnecting said valve means and said control unit vane for controlling the operation of said valve means, said interconnecting means including a resilient torsion member and a yieldable stop positioned to load said torsion member as said control unit vane approaches its limit of travel in one direction while restraining movement of said valve means and thereafter to release said valve means for movement under the impulse drive of said loaded torsion member to reverse the direction of fluid flow between said valve means and said vanes and thereby to reverse the direction of movement of each of said vanes.

2. In hydraulic windshield wiper apparatus the combination of a control unit and first and second slave units each having a pressure fluid power chamber, each of said chambers having a power vane disposed therein for angular oscillating movement, each of said chambers having fluid ports positioned on opposite sides of its power vane respectively, valve means operable by the angular movement of the power vane of said control unit chamber for controlling the alternate flow of fluid under pressure to the opposite sides of its said vane, means for passing fluid between said valve means and the fluid port on one side of the vane of said control unit chamber, means for passing fluid between the fluid port on the other side of said control unit vane and the fluid port on one side of said first slave unit vane, means for passing fluid between the fluid port on the other side of said first slave unit vane and one side of the vane of said second slave unit, means for passing fluid between the port on the other side of said second slave unit vane and said valve means, and drive mechanism interconnecting said valve means and said control unit vane so as to cause said valve means to reverse the direction of fluid flow between said valve means and said vanes in response to angular movement of said control unit vane and thereby to reverse the direction of movement of each of said vanes.

3. Apparatus as claimed in claim 1 in which a reciprocable parking pin is positioned in the wall of said slave unit chamber for engagement jointly with a partial recess in a relatively fixed member and a cooperating partial recess in a shaft angularly movable with said slave unit vane into registered position when said vane is at one end of its stroke, a spring for urging said pin toward engagement in said registered partial recesses and means for supplying pressure fluid against said pin in opposition to said spring, said spring being of such strength as to yield under operative predetermined fluid pressure and to move said pin into locking engagement when said fluid drops below said predetermined pressure.

4. In a device of the character described the combination of at least two pressure fluid power chambers, each of said chambers having a power vane disposed therein for angular oscillating movement, each of said chambers having fluid ports positioned on opposite sides of its power vane respectively, valve means operable by the angular movement of the power vane of one of said chambers for controlling the alternate flow of fluid on the opposite sides of said vane, a hydraulic sump, means for passing fluid from said sump to said valve means under pressure, means for passing fluid between said valve means and the fluid port one one side of the vane of said one chamber, means for passing fluid between the fluid port on the other side of the vane of said one chamber and the fluid port on one side of the vane of said other chamber, means for passing fluid between the fluid port on the other side of the vane of said other chamber and said valve means, means for passing fluid from said valve means to said sump, drive mechanism interconnecting said valve means and said vane of said one chamber so as to cause said valve means to reverse the direction of fluid flow between said valve means and said vanes in response to angular movement of said vane of said one chamber and thereby to reverse the direction of movement of each of said vanes, means including second valve means for passing fluid from said fluid port on said other side of the vane of said one chamber and said fluid port on said one side of the vane of said other chamber to said sump, means operable by said fluid under pressure for closing said second valve means when the pressure of said fluid under pressure exceeds a preselected value, and resilient means for opening said second valve means against the urging of said fluid under pressure when the pressure of said fluid under pressure is less than said preselected value.

5. In a device of the character described the combination of at least two pressure fluid power chambers, each of said chambers having a power vane disposed therein for angular oscillating movement, each of said chambers having fluid ports positioned on opposite sides of its power vane respectively, valve means operable by the angular movement of the power vane of one of said chambers for controlling the alternate flow of fluid on the oposite sides of said vane, a hydraulic sump, means for passing fluid from said sump to said valve means under pressure, means for returning fluid from said valve means to said sump, means for passing fluid between said valve means and the fluid port on one side of the vane of said one chamber, means for passing fluid between the fluid port on the other side of the vane of said one chamber and the fluid port on one side of the vane of said other chamber, means for passing fluid between the fluid port on the other side of the vane of said other chamber and said valve means, drive mechanism interconnecting said valve means and said vane of said one chamber so as to cause said valve means to reverse the direction of fluid flow between said valve means and said vanes in response to angular movement of said vane of said one chamber and thereby to reverse the direction of movement of each of said vanes, a hydraulic cylinder having a piston therein, means including a fluid port in said cylinder for passing fluid from said fluid port on said other side of the vane of said one chamber and said fluid port on said one side of the vane of said other chamber to said sump, said cylinder on one side of said piston being in communication with said fluid under pressure whereby said fluid under pressure urges said piston in one direction to close said port in said cylinder, and resilient means for urging said piston in a direction to open said port in said cylinder, the resilient means being sufficiently strong to overcome the urging of the fluid under pressure and thereby move the piston to open the port in the cylinder when the pressure of said fluid under pressure is below a preselected value.

6. In a hydraulic actuator the combination of a housing having a cylinder bore therein, a bobbin disposed within said bore, said bobbin comprising end flanges spaced apart by axially extending oppositely disposed spacer portions, a power vane shaft journaled for angular reciprocation within said housing and having a slot extending therethrough transverse to the reciprocation axis of said shaft, a power vane slidably disposed in said slot for movement with said shaft and extending outwardly beyond said shaft on opposite sides thereof between said bobbin flanges and having its outer ends disposed in close proximity to said cylinder bore, a pair of power chambers provided within said cylinder bore surrounding said shaft and between said spool flanges and spacer portions, said oppositely extending vane ends positioned in said pair of power chambers respectively and serving to divide each power chamber into two sections.

7. In a hydraulic actuator the combination of a housing having a cylinder bore therein, a bobbin disposed within said bore and fixed to said housing, said bobbin comprising concentric circular end flanges provided with axially aligned bearing bores and spaced apart by axially extending oppositely disposed spacer portions radially extending between the outer diameters of the end flanges and the bearing bores, a power vane shaft journaled in said bearing bores for angular reciprocation and having a slot extending therethrough transverse to and intersecting the reciprocation axis of said shaft, a power vane slidably disposed in said slot for movement with said shaft and extending outwardly beyond said shaft on opposite sides thereof and having its outer ends disposed in close proximity to said cylinder bore, a pair of power chambers provided within said cylinder bore surrounding said shaft and between said spool flanges and spacer portions, said oppositely extending vane ends positioned in said pair of power chambers respectively and serving to divide each power chamber into two sections.

8. A hydraulic actuator as claimed in claim 6 in which said power vane is provided with open passageways placing diagonally opposite of said chamber sections in communication, ports in said spacer portions for the passage of fluid into and out of opposite chamber sections in one of said pair of chambers and pressure actuated valves for controlling the passage of fluid through said ports.

9. A hydraulic actuator as claimed in claim 6 in which said shaft is provided with a shoulder in substantially the same plane as an adjacent face of one of said spool flanges, said shoulder and flanges jointly provided with a recess partly formed in each said shoulder and said flange and so positioned that only when said vane is at the end of its oscillation stroke in one direction said partial recesses are in register, a parking pin in axial alignment with the partial recess in said flange, means to exert system fluid pressure against said pin to urge it from engagement in said recess and a spring urging said pin into locking engagement when system fluid pressure is lower than predetermined operating pressure.

10. In a hydraulic actuator the combination of a housing having a cylinder bore therein, a bobbin disposed within said bore, said bobbin comprising end flanges spaced apart by axially extending oppositely disposed spacer portions, a power vane shaft journaled for angular reciprocation within said housing and having recess means therein extending transverse to the reciprocation axis of said shaft, power vane means slidably disposed in said recess means for movement with said shaft and extending outwardly beyond said shaft on opposite sides thereof between said bobbin flanges and having outer ends disposed in close proximity to said cylinder bore, a pair of power chambers provided within said cylinder bore surrounding said shaft and between said spool flanges and spacer portions, said oppositely extending vane ends positioned in said pair of power chambers respectively and serving to divide each power chamber into two sections.

11. In apparatus of the character described the combination of at least two pressure fluid power chambers, each of said chambers having a fluid pressure responsive member positioned therein for angular oscillating movement, each of said chambers having fluid ports positioned on opposite sides of its fluid pressure responsive member respectively, valve means for controlling the alternate flow of fluid under pressure to the opposite sides of said fluid pressure responsive members, means for passing fluid under pressure between said valve means and a fluid port on one side of the fluid pressure responsive member of one of said chambers, means for passing fluid under pressure between a fluid port on the other side of the fluid pressure responsive member of said one chamber and a fluid port on one side of the fluid pressure responsive member of the other of said chambers, means for passing fluid under pressure between a fluid port on the other side of said fluid pressure responsive member of said other chamber and said valve means, and drive mechanism interconnecting said valve means and said fluid pressure responsive member of said one chamber so as to cause said valve means to reverse the direction of fluid flow between said valve means and said fluid pressure responsive members in response to movement of said fluid pressure responsive member of said one chamber and thereby to reverse the direction of movement of each of said fluid pressure responsive members.

References Cited in the file of this patent

UNITED STATES PATENTS

| | | |
|---|---|---|
| 1,944,351 | Landry | Jan. 23, 1934 |
| 1,969,094 | Rappl | Aug. 7, 1934 |
| 2,348,492 | O'Shei | May 9, 1944 |
| 2,399,719 | Bergh | May 7, 1946 |
| 2,547,175 | Sacchini | Apr. 3, 1951 |
| 2,609,795 | Freedman | Sept. 9, 1952 |